INVENTOR.
PAUL HERSCH
BY RUDOLF DEURINGER

ATTORNEY

Sept. 10, 1968    P. HERSCH ET AL    3,401,098
METHOD FOR PRODUCING OXIDES OF NITROGEN
Original Filed June 7, 1963

INVENTOR.
PAUL HERSCH
BY RUDOLF DEURINGER

ATTORNEY

United States Patent Office 3,401,098
Patented Sept. 10, 1968

3,401,098
METHOD FOR PRODUCING OXIDES OF NITROGEN
Paul Hersch, Fullerton, and Rudolf Deuringer, Garden Grove, Calif., assignors to Beckman Instruments, Inc., a corporation of California
Original application June 7, 1963, Ser. No. 286,235, now Patent No. 3,326,794, dated June 20, 1967. Divided and this application Apr. 28, 1967, Ser. No. 652,641
12 Claims. (Cl. 204—103)

ABSTRACT OF THE DISCLOSURE

A method for producing oxides of nitrogen in which nitrogen oxide is formed by the electrolytic reduction of nitrosyl salts dissolved in a concentrated or water-free solution of a non-volatile, strong acid. The nitrogen oxide formed by electrolysis is prevented from reacting with oxygen in the vicinity of the acid so that $NO_2$ which would otherwise be formed will not dissolve in the acid. The method provides means for easily calibrating analytical instruments.

---

This is a divisional application of our copending application Ser. No. 286,235, filed June 7, 1963, entitled, "Apparatus for Producing Oxides of Nitrogen," now Patent No. 3,326,794, assigned to the assignee of the present application. This invention relates to the generation of oxides of nitrogen and, in particular, to the generation of nitric oxide and nitrogen dioxide in controlled quantities and concentrations.

In view of the contamination of the atmosphere in certain areas due to the two toxic constituents, nitric oxide and nitrogen dioxide from motor vehicle exhaust gas, effluent gases of industrial plants, and other causes, methods are required for assessing the level of these highly poisonous products and thus in finding remedies against their hazards. In order to determine the level of these gases in the atmosphere, instruments are required which must be accurately calibrated. This invention provides a means for calibrating such instruments by producing a stream of air or other gases containing a constant, very low, yet accurately known, and readily adjustable, proportion of nitric oxide or nitrogen dioxide.

The conventional methods for making highly dilute mixtures of nitric oxide and nitrogen dioxide for calibration purposes or the like require a stored supply either of the components in their unmixed state or of ready-made dilutions with very pure nitrogen, in the case of nitric oxide, or with dry air in the case of nitrogen dioxide. The first method requires safety precautions and special types of valves because of the aggressive nature of nitric oxide and nitrogen dioxide upon release into the atmosphere. The second method, apart from the hazards and inconveniences of pre-dilution, has the disadvantage that mixtures of the two nitrogen oxides in other gases are not easily maintained. Also, the concentration of the oxides is often subject to a continual change due to adsorption and corrosion processes in containers and upon contact with the ducts, valves, flowmeters, fittings, etc., during delivery to a desired location.

The principal object of the present invention is to completely obviate the above-mentioned difficulties by generating nitric oxide and nitrogen dioxide as required rather than storing these aggressive gases.

Another object of the invention is to provide a method and apparatus for delivering a stream of gas containing a constant, very low, but readily adjustable quantity of nitric oxide or nitrogen dioxide.

According to the principal aspect of the present invention, nitric oxide is formed by the electrolytic reduction of an electrolyte of a nitrosyl salt dissolved in either a water-free or a concentrated solution of a non-volatile, strong acid and the nitric offiide is prevented from reacting with air or oxygen in the vicinity of the electrolyte, and thus from producing nitrogen dioxide, which would readily dissolve in the electrolyte.

According to another aspect of the invention, the nitric oxide produced in the manner stated above is reacted with oxygen at a point remote from the electrolyte to produce nitrogen dioxide whereby the nitrogen dioxide will not dissolve in the electrolyte. By so generating nitric oxide, or indirectly, nitrogen dioxide, a carrier stream of gas which is preferably dry, that is, free of water, may deliver the nitric oxide or nitrogen dioxide to a desired location at a constant rate and the proportion or concentration of these gases in the carrier stream may be readily adjustable for calibration purposes or the like.

Other objects, aspects and advantages will become apparent from the following description taken in conjunction with the accompanying drawings wherein:

FIG. 1 is a diagram of the electrical circuit used with the apparatus in FIG. 1;

FIG. 4 is an elevation view, partially in section, of an apparatus for producing nitrogen dioxide in accordance with the principles of the present invention.

Figure 1:
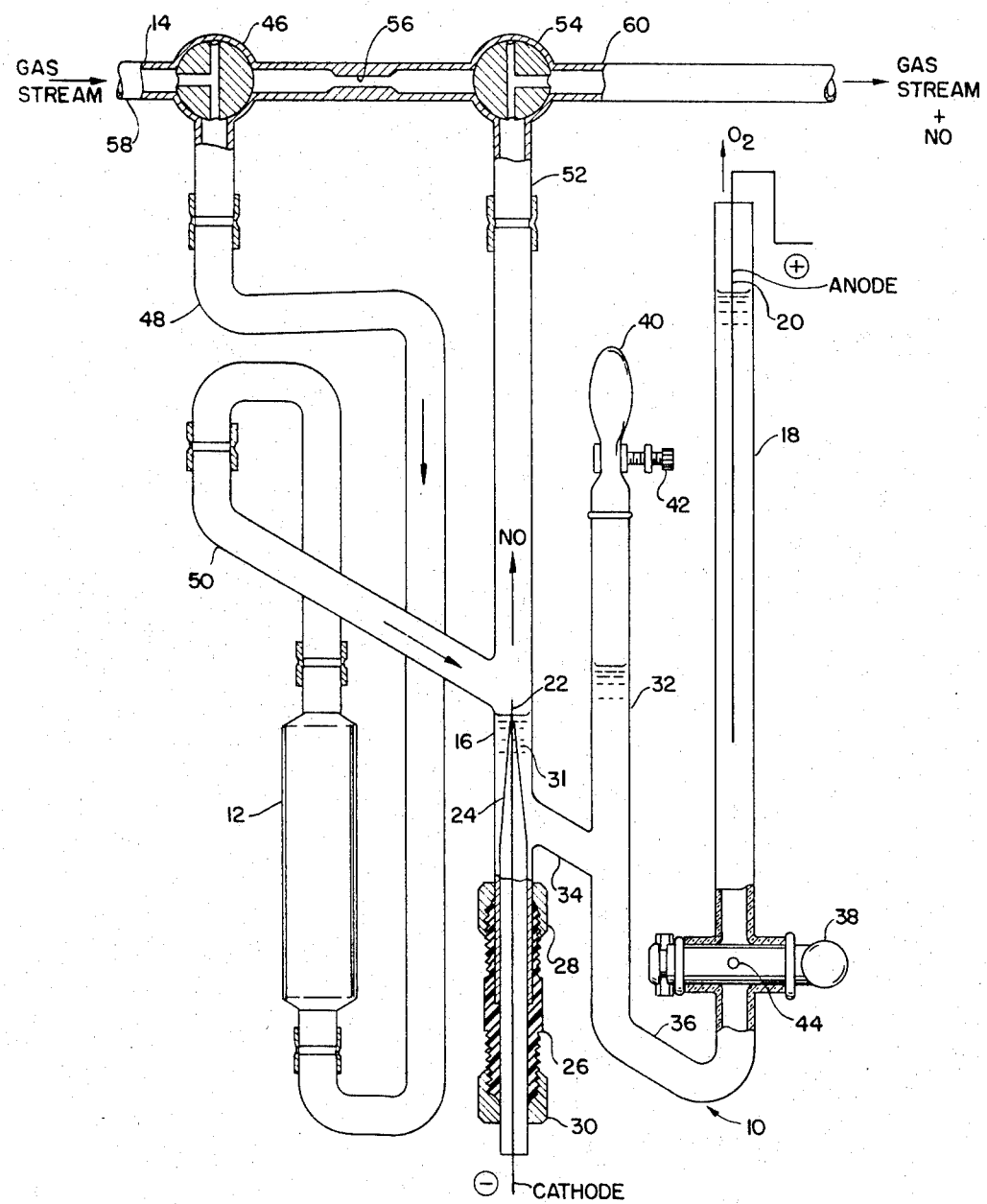
FIG. 1 is an elevation view, partially in section, of an apparatus for producing nitric oxide.

We have found that when a nitrosyl salt is dissolved in either a water-free or a concentrated solution of a a non-volatile, strong acid and electrolyzed between a pair of electrodes of inert metal, nitric oxide is quantitatively evolved from the cathode in accordance with the simple equation $$NO^+ + e^- = NO \tag{1}$$

If the gas spaces over the two electrodes are separated so that the gases evolving from the electrodes do not mix, it has been further found that the quantity of nitric oxide evolved at the cathode, as determined by using a gas burette, compares with the theoretical quantity of nitric oxide which should be produced as determined by Faraday's law.

In the above-described electrolysis, the anode also evolves a gas according to the reaction $$2SO_4^{--} = S_2O_7^{--} + \tfrac{1}{2}O_2 + 2e^- \tag{2a}$$

The following additional reactions may also be involved:

$$2SO_4^{--} = S_2O_8^{--} + 2e^- \tag{2b}$$

and $$NO^+ + 2SO_4^{--} = NO_2^+ + S_2O_7^{--} + 2e^- \tag{2c}$$

Although nitric oxide is evolved at the cathode in accordance with the Equation 1 by performing the above-described electrolysis, if the gas space above the cathode is merely an atmosphere of stagnant air, the nitric oxide immediately reacts with the oxygen in the air in accordance with the equation $$NO + \tfrac{1}{2}O_2 = NO_2 \tag{3}$$

Thus although nitric oxide is initially evolved at the cathode it is immediately consumed due to its reaction with oxygen in the air. The nitrogen dioxide produced by said reaction then dissolves rapidly in the electrolyte where it is reduced in accordance with the equation $$NO_2 + 3H^+ + e^- = NO^+ + H_3O^+ \tag{4}$$

The net effect of the consecutive reactions (1), (3) and (4) is $$\tfrac{1}{2}O_2 + 3H^+ + 2e^- = H_3O^+ \tag{5}$$

In other words, the oxygen in the air is reduced cathodically through a catalytic mechanism involving NO, $NO^+$ and $NO_2$, with no net generation or consumption of any of these three species.

What is needed then is some means of preventing the nitric oxide generated in accordance with Equation 1 from reacting with oxygen in the atmosphere and dissolving back into the electrolyte. It has been found that the reaction of the nitric oxide with oxygen may be prevented in several ways. One manner of preventing the nitric oxide from reacting with oxygen to form nitrogen dioxide is by providing inert gas in the gas space above the cathode of the electrolysis cell, examples of suitable gases being hydrogen, nitrogen, argon, helium or methane. The inert gas may be a stagnant body but it is preferable that it is a flowing stream so that it will carry the nitric oxide evolved at the cathode away from the cell as it is generated.

It has also been unexpectedly found that if a stream of water-free air or oxygen is passed over the electrolyte at the cathode, that is the catholyte, and if the amount of air or oxygen is large in comparison to the quantity of nitric oxide generated at the cathode, the rapid dilution of the nitric oxide renders Equation 3 exceedingly sluggish so that no $NO_2$ is found in the air stream. The kinetics of Equation 3 is well known and unusual in that triple collisions are necessary and occur as follows:

$$ON + OO + NO = ONO + ONO$$

When the NO is diluted $10^4$-fold by the air or oxygen stream, the frequency of the triple collisions mentioned above diminishes $10^8$-fold. Thus, by diluting the nitric oxide generated at the cathode with the stream of air or oxygen, the possibility of the reaction in Equation 3 occurring is virtually eliminated and the nitric oxide may be carried away from the electrolyte in the stream of gas without being converted into nitrogen dioxide.

It has been found that the nitrosyl salts suitable for dissolving in a strong, non-volatile acid to perform this method are nitrosyl-hydrogen-sulfate, $NOHSO_4$, and dinitrosyl-disulfate, $(NO)_2S_2O_7$. Suitable non-volatile, strong acids are sulfuric acid, perchloric acid, and phosphoric acid. It is important that these acids are either free of water or in very concentrated solution otherwise the nitrosyl salts would decompose upon dissolution.

In summary, although it is not possible to evolve cathodically nitric oxide into stagnant air or oxygen, it is possible to evolve this gas into a stream of water-free oxygen or air or into stagnant bodies or streams of inert gases such as nitrogen, argon, helium or methane.

The present invention contemplates still another method of generating nitric oxide without incurring the danger of the nitric oxide being further oxidized to dioxide as soon as formed, and then being lost by re-dissolution in the acid. This method involves placing the cathode in a container which narrows to form a capillary passage immediately above the cathode so that NO generated at the cathode leaves through the capillary passage without reacting with, and without meeting any, stagnant oxygen in the vicinity of the catholyte. This will be explained in further detail with respect to the apparatus disclosed in FIG. 4.

By electrolytically generating nitric oxide at the cathode of an electrolysis cell, the quantity of nitric oxide may be readily controlled and adjusted. This quantity is determined by Faraday's law which, when applied to the reaction in Equation 1, gives $$i = 0.0669 XF \qquad (6)$$

where $i$=electrolytic current in $\mu$a.
$X$=concentration of NO in v.p.m. (volumes per million)
$F$=flow rate of air or $N_2$ in cc./min. (measure at 20° C., 760 mm. Hg)

In order to produce a gas stream of 100 cc./min. at 20° C. and 760 mm. Hg, containing 20 v.p.m. of NO, the current that must be applied to the electrolysis cell is $$i = 0.0669 \times 20 \times 100 = 134 \mu a$$

The gas passing over the cathode, whether it be oxygen, air or an inert gas, must be water-free. Humidity in the gas stream causes hydrolysis of the nitrosyl ion at the surface of the catholyte causing the following reaction to occur $$2NO^+ + 3H_2 = NO + NO_2 + 2H_3O^+ \qquad (7)$$

which results in the evolution of both NO and $NO_2$, irrespective of current. Thus, means must be provided for drying the gas stream before it enters the electrolysis cell to carry NO away from the cathode.

Referring now to the drawings, which show the different forms of apparatus for performing the methods described above, there is illustrated in FIG. 1 the preferred embodiment of the invention for generating nitric oxide. The main components of the apparatus comprise an electrolysis cell, generally indicated by numeral 10, a gas drying tube 12 and a gas flow line 14 which may carry oxygen or air, which will carry the nitric oxide away from the electrolysis cell and by diluting the nitric oxide prevent it from converting to dioxide. The electrolysis cell comprises a vertically disposed cathode compartment 16 and an anode compartment 18. An anode 20 of inert metal such as platinum wire is positioned in the upper end of the anode compartment whereas a cathode 22, also of an inert metal such as platinum wire, is fused through the tip of a glass icicle 24. The icicle is secured to the lower portion of the cathode compartment by means of a flexible plastic fitting 26 compressed against the lower wall of the cathode compartment and the icicle by means of threaded sleeves 28 and 30. The cathode 22 protrudes from the lower end of the icicle for connection to a suitable electrical circuit whereas a small portion of the upper end of the cathode extends beyond the icicle for contact with the electrolyte 31. The electrolyte fills the lower portion of the cathode compartment and the major portion of the anode compartment.

A vertical tube 32 is positioned between the anode and cathode compartments and is connected at its lower end to a duct 34 which opens into the cathode compartment and is connected by means of duct 36 to a stop-cock 38 at the lower portion of the anode compartment. A flexible bulb 40 is provided at the upper end of the vertical tube 32 and a screw clip 42 surrounds the bulb for compressing the bulb and thereby varying the volume of air in the upper portion of the tube. The stop-cock 38 is provided with a small passage 44 which, when aligned with the anode compartment and duct 36, provides open fluid flow therethrough. When the stop-cock is positioned as shown in FIG. 1 with the passage 44 disposed at right angles with respect to the anode compartment, even though liquid flow is prevented, the migration of ions through the thin film of acid wetting the barrel of the stop-cock is still possible between the anode compartment and the duct 36. Generally, the stop-cock 38 remains closed, as illustrated in FIG. 1, preventing flow yet providing electrolytic conductivity between the anode and cathode compartments of the electrolysis cell.

In generating nitric oxide at the cathode, it is important that only a very small area of the cathode contacts the electrolyte so that large bubbles are avoided. Large bubbles tend to cling to the wire and detach themselves in an erratic manner, causing peaks and troughs in the concentration level of the nitric oxide generated. Therefore, the meniscus of the electrolyte in the cathode compartment must be closely controlled so that the cathode is only slightly in contact with electrolyte and bubbles of nitric oxide are so small as to hardly be visible without a magnifying glass. The flexible bulb 40 at the end of the tube 32 provides the control for the level of the meniscus of the electrolyte in the cathode compartment. It is obvious that by merely controlling the screw clip 42 thus either compressing or expanding the bulb 40, the volume of air in tube 32 is varied thereby varying the level of the meniscus in the cathode compartment.

Returning now to the remaining structure of the apparatus of the present invention, the gas flow line 14 includes a three-way valve 46 which is connected by a duct 48 to the gas drying tube 12. The drying tube may be filled with silica gel and $P_2O_5$ or any other suitable material for drying gas passing therethrough. The drying tube 12 is connected at its upper end by a duct 50 which opens into the cathode compartment 16 at a point adjacent the cathode 22. The upper end of the cathode compartment of the electrolysis cell is connected by a duct 52 to a second three-way valve 54 disposed in the gas flow line 14. A restriction 56 in the gas flow line between the two valves 46 and 54 provides a choke for gas passing therethrough when the valves are suitably positioned to permit the flow of gas through the line 14. The purpose of this choke will be discussed later. With the valves 46 and 54 positioned as shown in FIG. 1, the gas passes through the inlet end 58 of the gas flow line and through valve 46, duct 48, to the drying tube 12. From there, the gas passes through duct 50 to the cathode compartment where it carries the nitric oxide generated at the cathode through the upper portion of the cathode compartment, the duct 52, through valve 54 and out the outlet end 60 of the gas flow line where it may be delivered to an instrument for calibration or for any other desired purposes.

An apparatus as shown in FIG. 1 has been constructed with the inner cathode compartment being formed of a glass tube with an inner diameter of 6 mm. while the inner diameter of the glass anode compartment was 3 mm., that is semi-capillary. By having the cross-sectional area of the anode compartment smaller than the cross-sectional area of the cathode compartment, any leakage of electrolyte through the closed stop-cock 38 that would otherwise substantially affect the electrolyte level at the cathode is rendered insignificant. This is because the head of electrolyte in the anode compartment, balancing differentials of gas pressure, can vary appreciably with only small changes occurring in the liquid level at the cathode, even if the stop-cock were open. With the stop-cock closed, the level of liquid around the cathode remains virtually unaffected by pressure fluctuations. Thus, although the area of cathode metal exposed to the acid is very small, as desired, it does not run the danger of being reduced to nil during a temporary surge of gas pressure.

Although the electrolyte in the electrolysis cell 10 may be any one of the combinations of nitrosyl salts dissolved in concentrated or water-free solutions of non-volatile, strong acids mentioned above, the apparatus will also produce nitric oxide in accordance with the principles of the present invention if the anode compartment is filled with only concentrated sulfuric acid with no salts dissolved therein. Should the electrolyte in the cathode compartment ever become yellowish during operation of the apparatus, some pre-electrolysis in situ may be required. This removes reducible contaminants in the electrolyte. Normally this precaution is not necessary but it is best to maintain the electrolyte essentially colorless or only faintly violet in color. After prolonged electrolysis, especially at high currents, the electrolyte in the cathode compartment may become exhausted in $NO^+$ ions. Fortunately, the solubility of the nitrosyl salts allows a rich supply of these ions during initial operation of the apparatus. Occasional mixing, by manipulation of the flexible bulb 40, may nevertheless be required to ensure that a suitable supply of electrolyte containing the $NO^+$ ion is available at the cathode.

Figure 2:
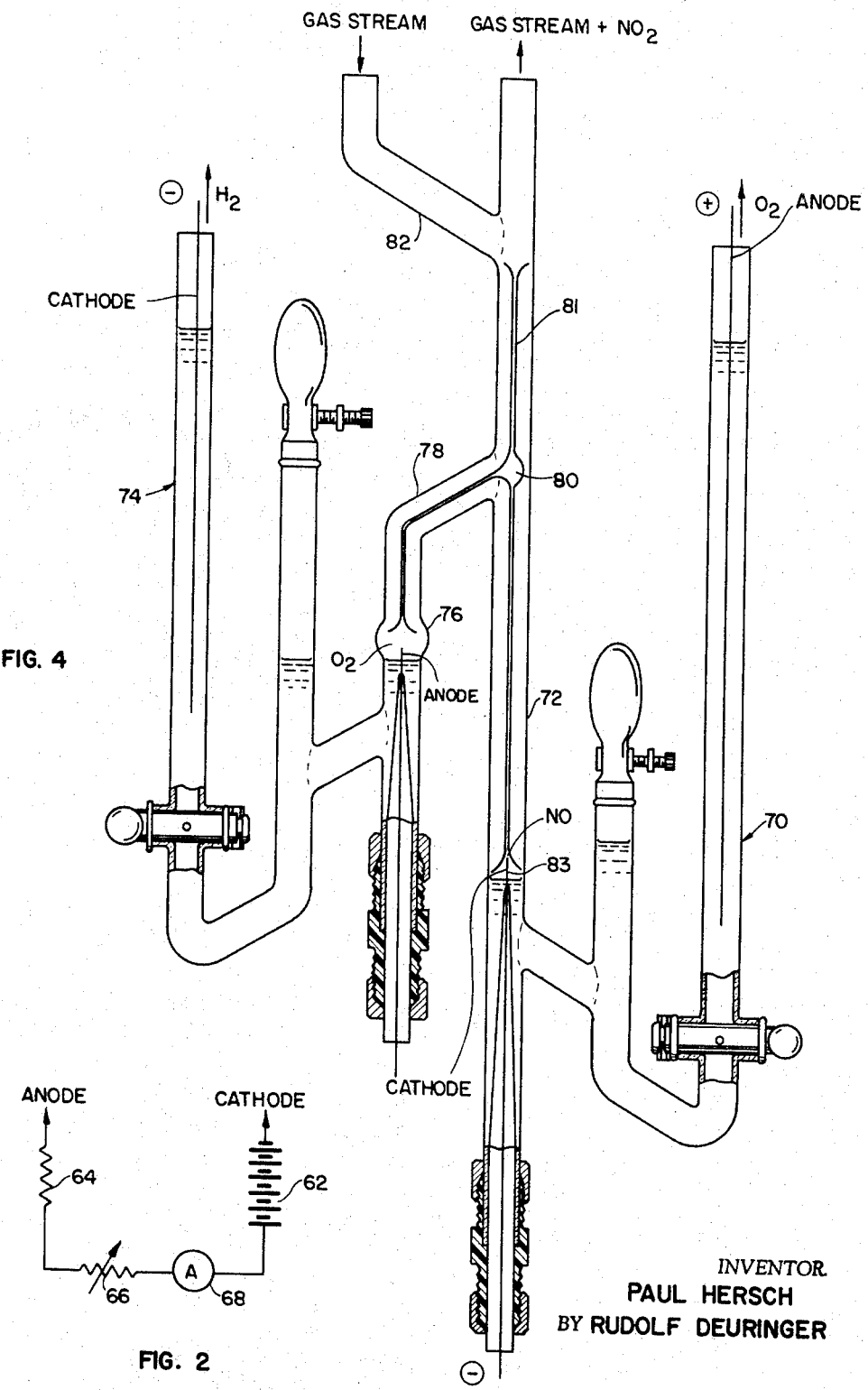

A suitable circuit for the apparatus illustrated in FIG. 1 is shown in FIG. 2. It consists of a battery 62 in series with a fixed resistor 64 and a variable resistor 66 and a micro or milliammeter 68. A circuit using a 45 volt battery and 22,500 ohm fixed and variable resistors has been used for supplying 2 ma. current to the electrolysis cell. This high voltage-high resistance circuit ensures a steady current unaffected by any fluctuations of the polarization resistances at the electrodes.

Figure 3:
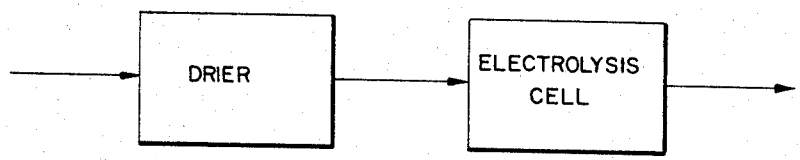
FIGS. 3a, 3b and 3c are diagrammatic views of three embodiments of the invention for producing nitric oxide.
Figure 3:
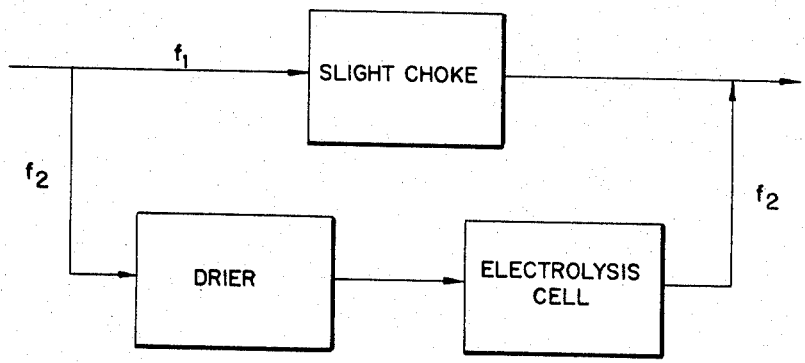
Figure 3:
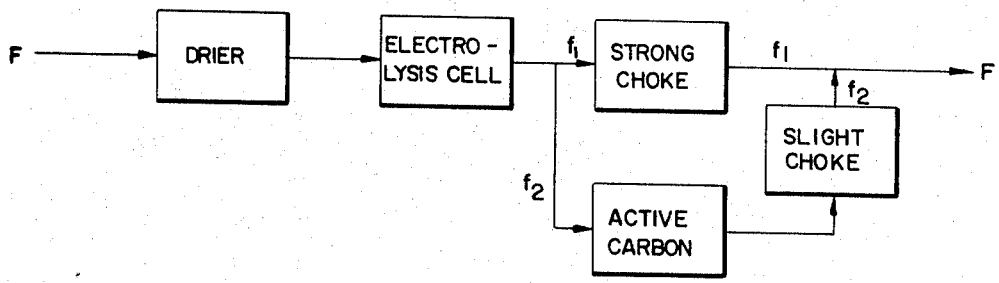

The electrolysis cell 10 and drying tube 12 may be used in several arrangements depending upon the particular application for which the apparatus is used. In FIG. 3a there is illustrated schematically the apparatus of FIG. 1 with the valves 46 and 54 positioned as shown in FIG. 1. Thus, the gas entering the inlet end of the gas flow line 14 passes directly to the drying tube 12 and into the electrolysis cell 10 before passing through the outlet end of the gas flow line. Thus, the entire gas stream, F cc./min., is dried and then provided with nitric oxide using the current calculated from Formula 6.

If the electrolysis cell is to be used frequently or continuously and the gas flow is large, the rate of consumption of drying material in the drying tube 12 and/or the pressure drop in the drying tube may become undesirably large. In this case, it is best to position valves 46 and 54 so that the gas will flow through the gas flow line as shown schematically in FIG. 3b. With this arrangement, the incoming gas stream is divided into two paths, $f_1$ and $f_2$, with the path $f_2$ being routed through the drying tube and electrolysis cell. The path $f_1$ passes through the restriction 56 in the gas flow line 14 which provides a slight choking of the gas passing therethrough. After the portion $f_2$ of the gas stream has picked up the NO in the electrolysis cell, it is reunited with the portion $f_1$ of undried gas. The exact ratio of $f_1$ to $f_2$ is irrelevant and does not affect the nitric oxide output, though a sudden increase or decrease of $f_2$ results in a transient decrease or increase of the concentration of NO in the final stream of gas passing from the gas flow line. By so passing only a portion of the gas stream through the drying tube 12, the drying material is not so quickly consumed and large pressure drops are not encountered.

When the desired level of concentration of nitric oxide in the gas stream is very small, obviously only a very low electrolytic input, is required. At currents below 20 $\mu$a. this results in noisy operation of the apparatus. In order to obviate this problem, the system illustrated in FIG. 3c may be used. In this case, an input larger than 20 $\mu$a. is provided to the cell and a portion $f_2$ of the total gas stream F emerging from the cell is routed through a tube filled with active carbon, absorbing all NO in $f_2$. This portion of the gas stream then passes through a mild choke and is then reunited with the other portion, $f_1$. The path of $f_1$ is also choked, more strongly than that of $f_2$. With this system, the electrolysis cell may be operated at relatively high electrolytic current which gives a smooth output, yet only a small level of NO is obtained in the outlet end of the gas stream. The current required in the apparatus shown in FIG 3c is $$i = 0.0669 X \left(\frac{F}{f_1}\right) F = 0.0669 X \frac{F^2}{f_1}$$

where X is the concentration level of NO, F is the total flow rate of gas and $f_1$ is the flow rate of gas bypassing the carbon. The ratio of $F/f_1$ depends on the flow restrictions or chokes in the two arms carrying $f_1$ and $f_2$. Glass capillaries or glass tubes choked with glass rods (not shown) may be used for these restrictions. The partial flow rate $f_1$ may be determined by temporarily inserting a soap bubble flowmeter in the branch of the gas flow line that contains the strong choke. In all three modes of operation disclosed herein, the response to electrolysis has been found to be very fast. In fact, the level of concentration of NO in the gas stream in response to the currents delivered to the electrolysis cell is as fast as a fast-responding analyzer transducing concentration of NO to an electrical signal.

It might be thought that the principles and apparatus utilized in the generation of nitric oxide might also be used in the generation of nitrogen dioxide, except that instead of the NO⁺ ion being cathodically reduced to NO it would be anodically oxidized to $NO_2$. In fact, the anodic process does not stop at the $NO_2$ stage, with formally tetravalent nitrogen, but it yields nitryl ions $NO_2^+$ with formally pentavalent nitrogen, as in nitric acid. It has been found, however, that $NO_2$ may be readily obtained by reacting electrolytically evolved NO with nearly-stagnant oxygen, provided the resulting $NO_2$ is isolated from the electrolyte. In contact with sulfuric acid, the $NO_2$ would dissolve in accordance with the equation

$$2NO_2 + 2H^+ = NO^+ + NO_2^+ + H_2O \qquad (8)$$

The nearly-stagnant oxygen is best provided by anodic evolution from a second electrolyzer. The cathode compartment of the first electrolyzer and the anode compartment of the second electrolyzer should abut into a small reaction compartment where $NO_2$ is formed. The flow of NO into this reaction space should take place through a narrow capillary duct at a speed sufficient to suppress any back-diffusion of $NO_2$ towards the NO-producing catholyte. Likewise, the oxygen should enter the reaction space through a narrow capillary preventing the diffusion of $NO_2$ towards the $O_2$-producing anolyte.

An apparatus which is suitable for performing this method is shown in FIG. 4 which illustrates an electrolysis cell 70 identical in construction to the cell 10 illustrated in FIG. 1 except for the fact that the upper portion of the cathode compartment 72 is in the form of a very small capillary tube, for example one having an inner diameter less than one-half millimeter. A second electrolysis cell 74 is provided, also identical to the cell 10 in FIG. 1, except that the polarities of the electrodes are reversed and an enlarged chamber 76 is provided just above the anode of the cell. In this apparatus, nitric oxide is evolved at the cathode of the electrolysis cell 70 and oxygen evolved at the anode of the cell 74. The choice of electrolyte in cell 70 may be the same as that used in the embodiment of the invention illustrated in FIG. 1 whereas the electrolyte in cell 74 may be any of the electrolytes normally used for generating oxygen. It may also be concentrated sulfuric acid but without nitrosyl salt dissolved therein. The portion 78 of the anode compartment of the cell 74 just above the chamber 76 is a capillary tube like tube 72 of the cathode compartment of cell 70. Capillary 78 connects to the capillary 72 and an enlarged reaction space 80 is provided where oxygen evolved at the anode of cell 74 reacts with the NO evolved at the cathode of cell 70 to form $NO_2$. The tubes 72 and 78 have a bore so narrow as to prevent (so long as NO and $O_2$ is generated) the penetration of $NO_2$ back into the electrode compartments. The $NO_2$ leaves the reaction space 80 through the capillary 81 and is picked up by a carrier gas stream passing through duct 82.

The two electrolysis cells 70 and 74 in FIG. 4 may be supplied with electricity from two independent sources or they may be fed in parallel from one single battery with appropriate resistors in each branch. The minimum current necessary for the generation of oxygen in cell 74 is twice the current necessary for evolving the required amount of NO in the cell 70. In practice, a ratio of 4 to 1 or greater, instead of 2 to 1, is advisable. The excess oxygen helps to sweep the $NO_2$ formed in the reaction space 80 into the carrier gas stream which enters the apparatus through duct 82. The conical space 83 immediately above the cathode in the cell 70 and the reaction space 80 where the NO and $O_2$ mix should be made as small as possible so that they may be readily purged by the gas evolved at the electrodes. Even if these spaces are small, a time lag of some thirty minutes at 1 ma. current to the NO-generating cell occurs before a steady flow of $NO_2$ is established. The smaller the input is into the electrolysis cells, the longer is this time lag. It is therefore best to start up the cells with a high input, e.g. 1 ma. for the NO cell and 4 ma. for the oxygen cell and to reduce the input later to the desired level. Once the delaying gas spaces have been purged by electroltyically generated gases, NO and $O_2$, the response of the apparatus to step changes of current input is fast.

By electrolytically generating oxides of nitrogen in accordance with the principles disclosed herein, no hazards arise from toxic fumes as in the case when nitric oxide or nitrogen dioxide is stored in steel tanks or the like. Also, there is no uncertainty as to the concentration level of these gases since they are closely controlled by the electrical input into the electrolysis cells. Further, by utilizing the apparatus shown in the drawings, there is no need for transporting, storing, opening and injecting tank supplies, and there is no requirement for expensive corrosion resistant containers and accessories. The apparatus of this invention permits an in situ generation of the required concentration levels of oxides of nitrogen in a flowing stream of air or other gases and the concentration level of the oxides of nitrogen in the carrier stream may be rapidly and conveniently varied by simply turning a dial for the adjustment of a variable resistor.

As initially mentioned, this invention has important applications in the field of atmosphere pollution studies. For example, it provides a means for artificially polluting air with oxides of nitrogen at desired concentration levels for research purposes. The invention further has important applications in chemical experiments involving the addition of nitrogen oxides in known quantities and at known rates since these reactive gases are well suited for determining other species with which they can react quantitatively, such as free atoms, radicals, or olefinic compounds.

Although several embodiments of the invention have been disclosed herein for purposes of illustration, it will be understood that various changes can be made in the form, details and arrangement and proportions of the various parts in such embodiments without departing from the spirit and scope of the invention as defined by the appended claims.

What is claimed is:
1. In a method for generating an oxide of nitrogen, the steps comprising:
    forming NO by the electrolytic reduction of a nitrosyl salt dissolved in a concentrated solution of a nonvolatile strong acid; and
    preventing the NO from reacting with oxygen in the vicinity of said acid.
2. A method as set forth in claim 1 wherein the NO is prevented from reacting with oxygen by carrying the NO away from said acid before the NO reacts with oxygen to form $NO_2$ in the vicinity of the acid.
3. A method as set forth in claim 1 wherein the NO is prevented from reacting with oxygen by isolating the NO from said acid.
4. A method as recited in claim 1 wherein said acid is selected from the group consisting of sulfuric acid, perchloric acid and phosphoric acid.
5. A method as recited in claim 1 wherein said nitrosyl salt is selected from the group consisting of dinitrosyl disulfate and nitrosyl-hydrogen-sulfate.
6. A method as recited in claim 1 wherein said NO is prevented from reacting with oxygen by passing a stream of dry gas selected from the group consisting of air, oxygen, hydrogen, nitrogen, argon, helium and methane over the acid at a rate sufficient to prevent $NO_2$ from being formed by the action of oxygen contained in whatever proportion in such stream.
7. A method as recited in claim 1 wherein said NO is prevented from reacting with oxygen by providing a body of dry inert gas over the acid.
8. A method as recited in claim 7 wherein said gas is selected from the group consisting of hydrogen, nitrogen, argon, helium and methane.

9. In a method for generating an oxide of nitrogen, the steps comprising:
forming NO by the electrolytic reduction of a nitrosyl salt dissolved in a water-free, non-volatile, strong acid; and
preventing the NO from reacting with oxygen to form $NO_2$ in the vicinity of said acid.

10. A method as recited in claim 9 wherein said salt is selected from the group consisting of dinitrosyl disulfate and nitrosyl-hydrogen-sulfate.

11. In a method for generating $NO_2$, the steps comprising:
forming NO by the electrolytic reduction of a nitrosyl salt dissolved in a concentrated solution of a non-volatile, strong acid;
allowing the NO to flow away from said acid without subsequently reacting with oxygen in the vicinity of said acid; and
reacting the NO with oxygen at a point remote from said acid to form $NO_2$.

12. A method as recited in claim 11 wherein said oxygen reacted with the NO is electrolytically generated.

References Cited

UNITED STATES PATENTS

| 1,008,383 | 11/1911 | Sparre | 204—103 |
| 1,021,234 | 3/1912 | Von Berneck | 204—103 |
| 1,865,917 | 7/1932 | Kaselitz | 23—157 |
| 3,069,233 | 12/1962 | Marullo et al. | 23—157 |

FOREIGN PATENTS

| 458,877 | 8/1949 | Canada. |
| 10,522 | 6/1911 | Great Britain. |

JOHN H. MACK, *Primary Examiner.*

D. R. JORDAN, *Assistant Examiner.*